(12) United States Patent
Cegla et al.

(10) Patent No.: US 6,913,771 B2
(45) Date of Patent: Jul. 5, 2005

(54) PROCESS FOR THE PRODUCTION OF SOYBEAN SUGARS AND THE PRODUCT PRODUCED THEREOF

(75) Inventors: Uriel G. Cegla, Tel Aviv (IL); Moshe Shuster, Petha Tikva (IL)

(73) Assignee: Oladur, LTD, Tel Aviv (IL)

( * ) Notice: Subject to any disclaimer, the term of this patent is extended or adjusted under 35 U.S.C. 154(b) by 66 days.

(21) Appl. No.: 10/109,655

(22) Filed: Apr. 1, 2002

(65) Prior Publication Data

US 2003/0130501 A1 Jul. 10, 2003

(30) Foreign Application Priority Data

Jan. 9, 2002 (IL) .................................. 147529

(51) Int. Cl.⁷ .............................................. A61K 35/78
(52) U.S. Cl. ........................ 424/757; 426/430; 426/486
(58) Field of Search ........................ 424/757; 426/430, 426/486

(56) References Cited

U.S. PATENT DOCUMENTS

| | | | |
|---|---|---|---|
| 3,730,770 A | | 5/1973 | Zievers et al. |
| 4,312,979 A | * | 1/1982 | Takemoto et al. |
| 5,443,650 A | | 8/1995 | Saska et al. |
| 5,482,631 A | * | 1/1996 | Saska et al. |
| 5,833,858 A | * | 11/1998 | Umeda et al. |

FOREIGN PATENT DOCUMENTS

| | | |
|---|---|---|
| CN | 1070195 | 3/1993 |
| CN | 1259519 | 7/2000 |
| EP | 0 357 901 | 3/1990 |
| GB | 1056996 | 2/1964 |
| GB | 2317112 | 3/1998 |
| JP | 62198694 | 9/1987 |
| JP | 62263192 | 11/1987 |
| JP | 06142460 | 5/1994 |
| JP | 06092429 | 11/1994 |
| JP | 07082287 | 3/1995 |
| WO | WO 97/07811 * | 3/1997 |

* cited by examiner

*Primary Examiner*—Susan D. Coe
(74) *Attorney, Agent, or Firm*—Blank Rome LLP

(57) ABSTRACT

The present invention relates to a method for utilizing soy molasses as a source for soy sugars which are of high oligosaccharaide content. The invention provides a method for purifying soy molasses comprising the following steps: (i) contacting the soy molasses with alcohol and hydrocarbon solvent mixture, thereby two layers comprising a lower aqueous-alcohol layer and an upper hydrocarbon layer are formed; (ii) collecting the lower aqueous-alcohol layer; (iii) removing coloring, off-flavor and odorous substances; and (iv) removing minerals, thereby a purified soy molasses of more than 90 wt. % sugars, on dry matter basis, is obtained.

15 Claims, 2 Drawing Sheets

PROCESS FOR THE PRODUCTION OF SOYBEAN SUGARS AND THE PRODUCT PRODUCED THEREOF

BACKGROUND OF THE INVENTION

1. Field of the Invention

The present invention generally relates to soybean processing and utilization and more specifically to a process for utilizing soy molasses, a by-product in the soy protein concentrate production, for producing purified soy sugars rich in oligosaccharaides.

2. Discussion of the Related Art

Recently there is an increasing interest in oligosaccharaides as food supplements or food additives in health foods. The present invention relates to a process for producing soy sugars of high oligosaccharaide content, from soy molasses, a low cost by-product in the soy protein concentrate production.

Soy is one of the main vegetable sources for both edible oil and high protein foods throughout the world. Whole soybeans contain about 40% protein, 20% fat, 5% ash and 35% carbohydrates on dry matter basis. In the Far East, soy was used as a source for human protein requirement for thousands of years. In the West, by contrast, the majority of soybeans are processed into oil while the high-protein soybean meal is used mainly for various high-protein animal feeds and only to a small extent as a resource for human protein requirement. However, over the last decades, the importance of soy as a source for human protein requirement has been increasingly recognized in the Western market as well, and various human food products based on soy protein are now available for western consumers. Some of these products are based on soy protein concentrates for use as protein sources for human requirement and also as milk powder substitute for calves. The present invention relates to a process for utilizing a by-product of the soy protein concentrate production. Soy concentrates (SPC) is prepared either by aqueous extraction of the whole soybeans or by aqueous ethanol extraction or defatted soybeans flakes. The present invention relates to soy molasses which is obtained as a by-product of the latter process. According tot his method, the starting material for the production of SPC is dehulled, defatted soybean flakes with high protein solubility, known as white flakes. The concentration of protein is increased by removing most of the soluble non-protein constituents by extraction with aqueous ethanol. Soy molasses is the aqueous alcoholic extracts so obtained after the removal of the alcohol and part of the water. The soluble constituents include primarily soluble carbohydrates in the form of mono, di, and oligosaccharides, and also to a much lesser extent proteins of low molecular weight, lipids, and minerals.

Soybean molasses is a low cost material which impose environmental disposal problems and therefore is used mainly as low-cost animal feed ingredient. The main constituents of soy molasses, soy sugars, consist of about 65% mono and di-saccharaide and about 35% oligosaccabraides, mainly, raffinose (5–7%) and stachyose (30–32%). Soy oligosaccharaides are indigestible by humans and monogastric animals and indeed are considered to be the main cause for flatulence and discomfort suffered by soyfood consumption. However, soy oligosaccharaides are useful as growth stimulating agents for bifidobacteria (i.e., are prebiotic agents) which are known to have physiological benefits. Soy oligosaccharaides can also serve as low-sweetness functional additives for food. Recently, with increasing evidence of the potential benefits of "friendly" bifidobacteria, including reducing the risk of colon cancer, soy oligosaccharide are receiving considerable attention as a functional material promoting the growth of bifidobacteria populations. Oligosaccharide are therefore a useful material for relieving constipation, preventing obesity, controlling the aging process and preventing arteriosclerosis. Consequently, the market for soy oligosaccahrides has increased significantly in the last years. Soy oligosaccahrides are also expected to be used in a wide range of foods as a functional material for treating life-style-related diseases.

The present invention provides a method for utilizing soybean molasses, otherwise an environmental burden byproduct and therefore a low-cost animal feed ingredient, in soy processing. According to this method soy molasses are utilized for the production of sugar mixtures of high oligosaccharide content which can be used as food additives to various prebiotic and/or probiotic foods.

SUMMARY OF THE PRESENT INVENTION

It is an object of the present invention to provide a simple and economical method for producing purified soy sugars from soybean and in particular from soy molasses obtained as a byproduct in the manufacturing of soy protein concentrate by aqueous-alcohol extraction of de-oiled soy flakes. Soy molasses is the aqueous-alcohol extract of said aqueous-alcohol extraction after the removal of alcohol and some of the water.

In accordance with the present invention, there is thus provided a method for purifying soy molasses for obtaining purified soy molasses. Preferably the purified soy molasses contains over 90 wt. %, more preferably over 95 wt. %, sugars (on dry matter basis). The method comprising the removal of phospholipids (pl), the removal of coloring, off-flavors and odorous substances, the removal of proteins and the removal of minerals, from the molasses.

In accordance with a preffered embodiment of the present invention, phospholipids removal is performed according to a novel method taught by the present invention for extracting phospholipids from aqueous solutions. In accordance with this novel method, phospholipids are extracted by contacting the soy molasses with alcohol and hydrocarbon solvent mixture to form a lower aqueous layer and an upper hydrocarbon layer, thereby phospholipids are extracted from the aqueous-alcohol layer into the hydrocarbon layer. Preferably said alcohol is ethanol and said hydrocarbon solvent is hexane wherein the weight ratio ethanol:hexane is preferably in the range 3:1 to 1:1, when performed under conventional gravitational forces. Under enhanced gravitational forces, i.e., centrifugal forces, the ratio can be further decreased.

Removal of coloring, odors and off-flavors substances, removal of minerals and removal of some of the proteins, are preferably performed by suitable ion-exchange resins.

The purified soy molasses so obtained may be used as is or the process may further include a step of solidifying the purified soy molasses for obtaining a dry powder of soy sugars. In accordance with a preferred embodiment of the present invention, solidification of the purified soy molasses is performed by contacting the molasses with absolute ethanol under high shear mixing forces, to obtain a suspension of fine and further purified sugar particles, thereby a sugar powder is collected by means of filtration. The soy sugars powder so obtained may be used as is, or can be separated to isolate the oligosaccharaides, according to need.

The present invention further relates to the products produced by the above processes.

BRIEF DESCRIPTION OF THE DRAWINGS

The present invention will be understood and appreciated more fully from the following detailed description taken in conjunction with the drawings in which.

DETAILED DESCRIPTION OF THE INVENTION

Soy molasses is a by-product in the production of soy protein concentrate by aqueous ethanol extraction of defatted soy flakes. The molasses is obtained after evaporation of the ethanol and part of the water. Soy molasses is a light brown aqueous solution of unpleasant odor containing about 40–60% solids which comprise sugars, proteins, phospholipids and minerals. A typical molasses contains, on dry matter basis, 75–80 wt. % sugars, 9–12 wt. % phospholipids, 5–7 wt. % minerals and 4–6 wt. % low molecular weight protein. The sugars typically consist of about 65% mono and di-saccharaide and 35% oligosaccahraides.

Figure 1:
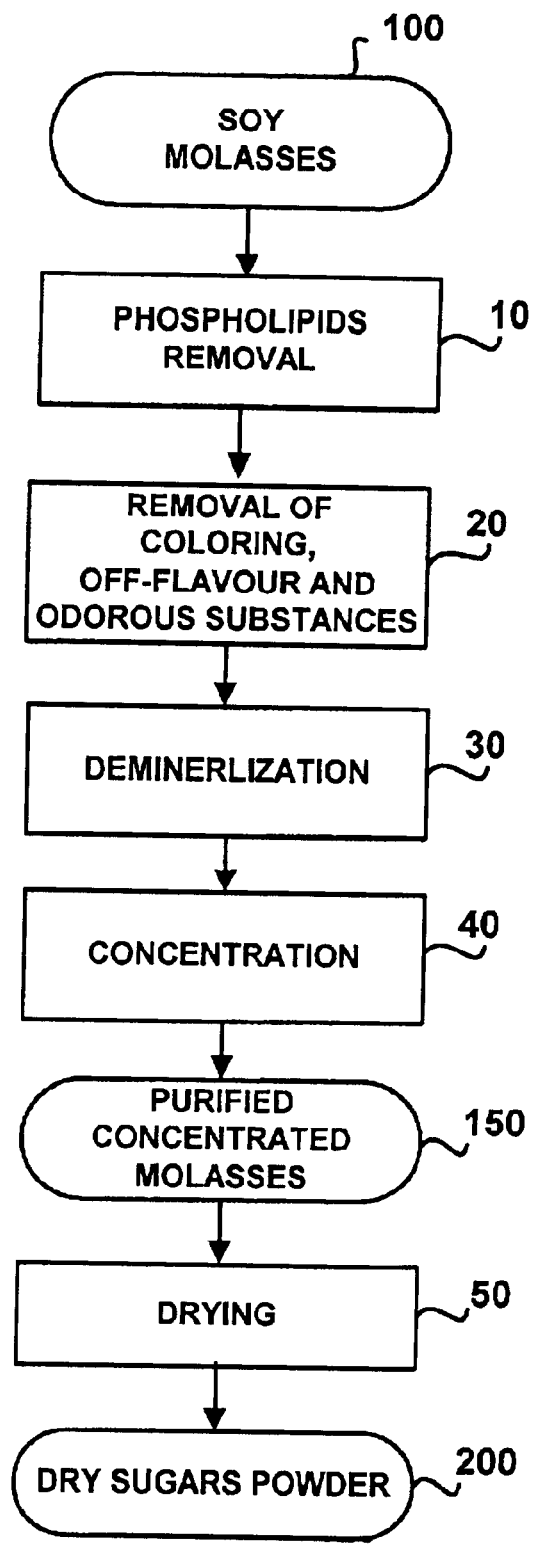
FIG. 1 is an overall flowchart showing the main steps of a process for purifying soy molasses in accordance with the present invention.

FIG. 1 gives an overall view of the present method for purifying soy molasses. Starting with soy molasses 100, the first step (step 10) is the removal of phospholipids, followed by the removal of coloring, off-flavors and odorous organic substances (step 20) and by the removal minerals (step 30). Then water is reduced to minimum (step 40) to obtain a concentrated purified molasses 150. The process may further include a step of solidifying the purified molasses (step 50) for obtaining a dry sugar powder 200. Proteins are removed to some extent in all of the above processes.

Figure 2:
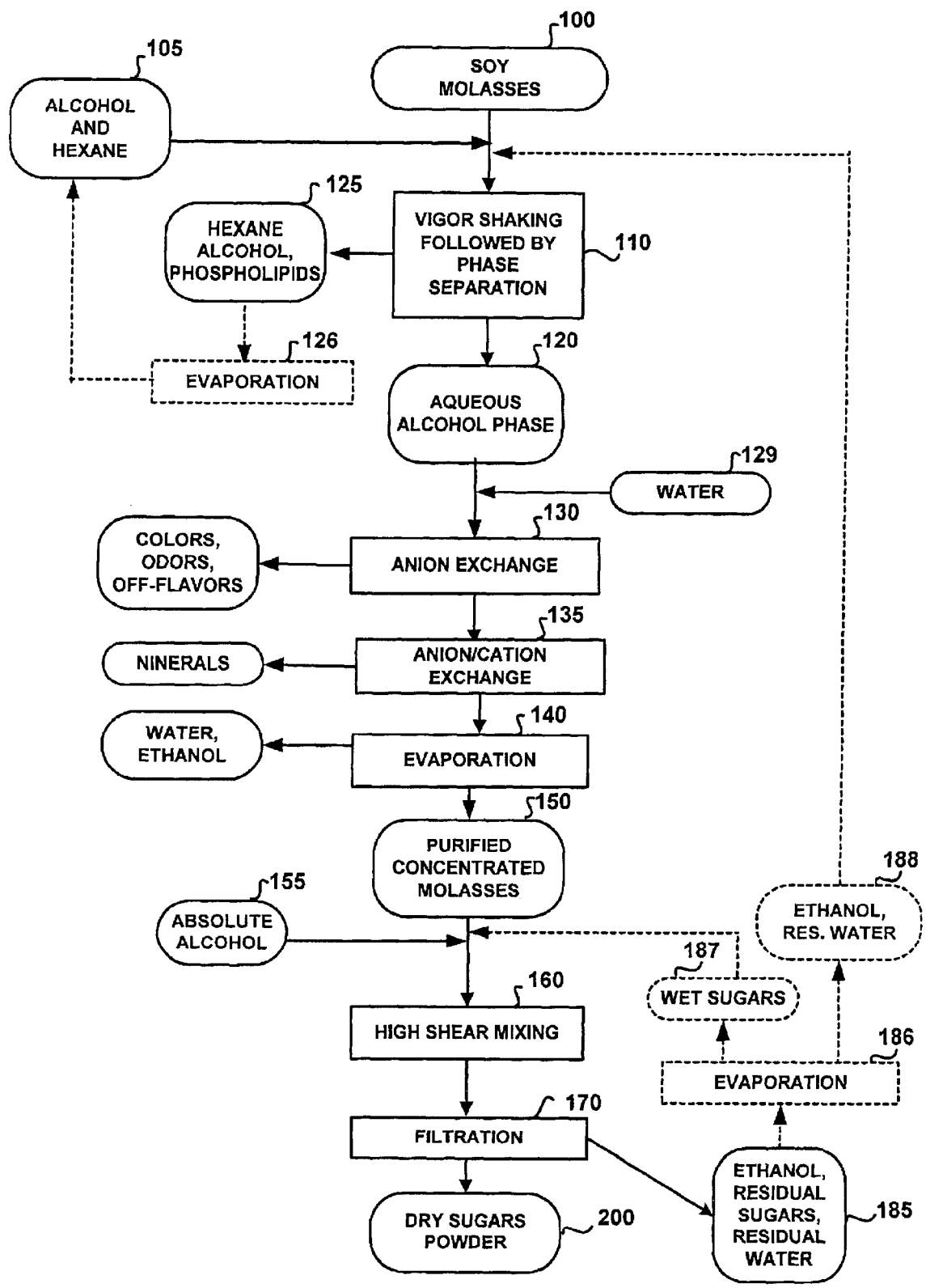
FIG. 2 is a detailed flowchart of a process for purifying soy molasses in accordance with a preferred embodiment of the present invention.

FIG. 2 gives a detailed flowchart of the process of the present invention including, in dashed lines, possible steps for recovery of solvents and other materials for enhancing the process efficiency and yield.

Starting with soy molasses 100, the first step of the present process is to remove phospholipids (step 10 of FIG. 1). Phospholipids, being known emulsifiers, cannot be extracted easily from the aqueous phase just by using a hydrocarbon solvent, such as hexane. Due to its emulsifying properties the presence of phospholipids causes the aqueous and hydrocarbon phases to form an emulsion rather than to separate into two phases. It was found by the inventors of the present invention that adding alcohol to the hydrocarbon solvent enables phase separation and drastically reduces the emulsification problem so that the mixture breaks into two distinct phases. Thus, in step 110 a warm (45–50° C.) mixture of ethanol and hexane 105 is added to molasses 100. The mixture is vigorously mixed, then left to separate into lower aqueous ethanol phase 120 and an upper hexane phase 125 which contains most of the phospholipids. Preferably, the amount of ethanol and hexane, added in step 110, is about 10–30 wt. % and 10–25 wt. % relative to the molasses weight, respectively.

The next step 130 is aimed at removing coloring, off-flavor and odorous organic substances, followed by demineralization step 135. In accordance with a preferred embodiment of the present invention, removal of coloring, off-flavor and odorous substances is performed by passing the molasses, after appropriate dilution (129), through strong anion-exchange resin such as Purolite-A860S while demineralization is performed by mixed bed anion/cation exchanger resin, such as Purolite-NRW-40. However it should be realized by a person skilled in the art that other methods known in the art can be employed as well, without departing from the scope of the present invention. For example step 130 can be performed in accordance with any known method for removal of organic contamination from sugar mixtures, such as bleaching, adsorption over activated carbon or ultra filtration. It will be also easily realized, that demineralization can be performed by separate anion exchanger and cation exchanger resins or by other known methods for demineralization of aqueous solutions such as, for example, reverse osmosis.

In the next step (140), the aqueous solution is concentrated by evaporation, preferably under vacuum at 45–50° C., to reach a solution of 80–90% solid content. The high concentrated molasses 150 so obtained contains 90 wt. % or more sugars on dry matter basis, while the total percentage of all other constituents present originally in the crude molasses drops from 25 to less than 8%.

If dry sugars powder is desired rather than high concentrated molasses, further solidification of molasses is possible according to any method known in the art, for example, by spray or freeze drying. Preferably, the method used by the present invention for drying and for simultaneously further purifying the molasses 150 in order to obtain dry and purer powder is a novel method developed by the inventors of the present invention and described in a copending application Ser. No. 10/109,654, incorporated herein by reference. According to this novel method, molasses 150 is mixed with absolute alcohol 155, preferably ethanol, under conditions of high shear mixing forces (step 160) in a high shear mixing apparatus, whereby a suspension of pure sugar particles is obtained. Preferably the ration between the absolute alcohol and the water content of molasses is about 50:1. The suspension is then filtered (stp 170) to collect the sugar particles which can be further dried, preferably under vacuum, to obtain a dry sugar mixture 200. The composition of sugars powder 200 is about the following: 90–95% sugars, 1–2% phospholipids, 1–2.5% protein, 0.3% or less minerals and up to 4% water.

The solidification method described in steps 160 and 170, is a simple, one-step process. It is preferred to other methods, such as spray drying or complete evaporation since it is simple, does not require complicated equipment and the solids are obtained as dry, non-sticky pure powder which does not adhere to equipment walls and does not cause clogging problems. Moreover, this method leaves foreign substances in the solution, resulting in purer solid particles, unlike evaporation methods in which contaminations are entrapped within the solid particles.

It should be noted, that although in the process as described above, no specific process is aimed at the removal of proteins, proteins are removed at each of the individual steps, to some extent, such that the relative amount of proteins in the final product is reduced by about 50%, as will be demonstrated in the following examples. It will be realized by persons skilled in the art that known methods for proteins removal, such as by precipitation or by ultrafiltration, may be further included, for further reducing the protein content in the final product.

Also shown in dashed lines are optional steps for increasing the efficiency of the present process and for increasing the sugars yield. Thus, upper phase 125 (obtained at step 110) containing hexane, ethanol, and a small amount of water and phospholipids can be separated (step 126) for reuse of the solvents in mixture 105. Also filtrate solution 185 which consists mostly of ethanol but also contains small amounts of sugars and water can be recovered for reuse. Filtrate 185 can be distilled (step 186), whereby ethanol 188 can be collected for reuse in step 110 and the wet sugars 187 left after evaporation can be added to molasses 150 for further processing through steps 160–190 for increasing the sugars yield.

The present invention will be further described and explained by the following examples. It will be easily appreciated that these examples are not exclusive and do not intend to limit the scope of the invention by any means but only to illustrate and demonstrate the invention.

EXAMPLE 1

The starting material for the present example was soy molasses of 47.4% solids content of the following composition: 76.4% sugar, 11.2% phospholipids, 5.1% minerals and 4.7% protein. The initial sugars composition is given in Table 3.

125 g ethanol and 75 g hexane were added to 500 g molasses (237 g solids) of the composition given above, in a separatory funnel. The molasses-hexane-ethanol mixture was mixed vigorously for a few minutes, then left to settle. After about 5 hours, phase separation was complete and the lower aqueous ethanol phase was collected to obtain 567 g of aqueous ethanol solution containing 210 g solids (88.6% of initial solids). The molasses were analyzed and were found to contain (dry matter basis) 4.2% phospholipids (33.3% of initial amount) and 4.4% protein (83.0% of initial amount). The solution was then diluted to 10% solids, heated to 60° C. and passed through a column of 43 mm diameter and 250 mm height, containing 420 ml of Purolite A860S resin at a rate of 2 resin volume per hour. The obtained solution contained 181 g solids (2.6 wt. % phospholipids, 4.6 wt. % protein). The solution was cooled to room temperature, further diluted with distilled water to a solution of 5–6% solids, and passed through a column of 43 mm diameter and 250 mm height containing 420 ml of Purolite NRW-40 resin at a rate of 4 resin volume per hour, to obtain 156 g solids (66% of initial amount) (2.1% phospholipids, 3.5% protein, 0.3% ash). Next, the solution was concentrated under vacuum at 47° C. in a Büchi rotary evaporator to obtain solution of 84.9% solids content and the concentrated solution while still hot was added, over a period of 30 seconds, to a vessel containing 1370 g of absolute ethanol, while the mixture was subjected to high shear mixing forces using an Ultra-Turrax T-25 basic with S25 N 25F dispersing tool (IKA) at 24,000 rpm, whereby a suspension of fine particles was formed. The suspension was filtered through Buchner funnel using filter paper (Whatman 42) under vacuum. The precipitate cake was further rinsed by 100 g cold absolute ethanol.

The collected precipitate was further dried under vacuum (0.05 bar) at 58° C. for 5 hours, to obtain 139.8 g of odorless white powder with a slight sweetish flavor. Analysis of the sample, according to the methods described below, gave the composition given in following Table 1. Table 2 shows the composition of the soy molasses components (on dry matter basis) before and after the purification process. Table 3 shows the sugar composition before and after the purification process and the yield of each of the sugars.

TABLE 1 composition of dry powder of purified soy molasses (total weight: 139.8 g)

| component | Weight percentage |
| --- | --- |
| sugars | 90.5% |
| protein | 2.4% |
| phospholipids | 2.0% |
| ash | 0.3% |
| water | 3.7% |
| unknown | 1.1% |
| total | 100% |

TABLE 2 main dry solid components of soy molasses before and after purification process (dry matter basis)

| component | % weight in starting material | % weight in final product |
| --- | --- | --- |
| Sugars | 76.4% | 94.0% |
| Protein | 4.7% | 2.5% |
| phospholipids | 11.2% | 2.1% |
| Ash | 5.1% | 0.3% |
| unknown | 2.6% | 1.1% |

TABLE 3 sugar composition before and after the purification process

| saccharaide | % weight in starting sugar mixture (total amount: 181 g) | % weight in final sugar mixture (total amount: 126.5 g) | yield |
| --- | --- | --- | --- |
| Stachyose | 32.2 | 33.0 | 71.6% |
| Raffinose | 5.7 | 5.8 | 71.1% |
| Sucrose | 53.9 | 54.0 | 70.0% |
| Maltose | 1.6 | 1.6 | 69.9% |
| Melibiose | 0.9 | 0.9 | 69.9% |
| * Mono-S | 3.5 | 2.6 | 51.9% |
| * Di-S | 2.2 | 2.1 | 66.7% |
| Average yield: | | | 69.9% |

* Mono-S relates to a group of monosaccharaides which are hard to distinguish by the analysis method employed by the present invention, i.e., are having about the same retention times (see analysis methods below). Similarly, Di-S relates to a group of indistinguishable disaccharaides.

Analysis methods. Samples of soy molasses were analyzed to determine composition, before, after and at different steps of the process, by the following analysis methods: Sugars: quanitative analysis for sugars was performed, after silanization, by gas chromatography (Varian CP-3800) using capillary column (WCOT fused silica, distributed by Chrompapck, cat. no. 7740). Chromotographies were run with two internal standard to determine absolute amount of each of the sugars; Phospholipids were determined in accordance with AOCS Ca 12-55 method. The phospholipids percentage was calculated by the formula: 25×% phosphor=% phospholipids, using a factor of 25 for phosphatidyl choline which is the soybean phospholipid soluble in alcohol. Since the molasses is obtained by alcohol-water extraction, the main phospholipid component in the molasses is phosphatidyl choline; Minerals (ash) content was determined by dry burning.; protein content was determined in accordance with the American Oil Chemists' Society (AOCS) Ac 4-91 method and protein was calculated according to the formula: % protein=% nitrogen×5.71 using soy protein factor of 5.71 as in AOCS Aa 5-91 method.

EXAMPLE 2

1500 g molasses, containing 711 g solids of the following composition: sugars 76.4%; phospholipids 11.2%; minerals 5.1%; protein 4.7%; unknown 2.6%, 380 g ethanol and 240 g hexane were placed in a separatory funnel and the mixture was shaken for a few minutes, then left to settle. After about 5 hours, the lower aqueous phase is collected to obtain 1713 g solution of 35% solid content (600 g solids) including 4.3% phospholipids and 3.8% protein (dry matter basis).

The solution was diluted to 10% solids, heated to 60° C. and passed through a column (60 mm diameter and 430 mm height) containing 1210 ml of Purolite A860S resin at a rate of 2 resin volume per hour, to obtain a solution of 495 g solids content. After cooling to room temperature, the solution was further diluted to a solution of 5–6% solids and was passed through a column (60 mm diameter and 390 mm height) containing 1110 ml of Purolite NRW-40 resin, at a rate of 4 resin volume per hour, to obtain 416 g solids.

The solution was concentrated by evaporation in a Büchi rotary evaporator under vacuum at 47° C. to obtain a solution of 79.5% solids. The obtained concentrated molasses, while still hot, was injected over a period of 30 seconds to the inlet of a high shear continuous inline mixing instrument (Ultra-Turrax® basic T-25 equipped with S 25 KV-25 F-IL dispersing head and DK 25.11 flow chamber, all manufactured by IKA), through which 5250 g of absolute ethanol were circulating in a closed system. A suspension of further purified fine particles was obtained. It will be easily realized by persons skilled in the art, that in an industrial application, the acetone and the purified molasses would be pumped through the inlet of the mixing apparatus without circulating the solvent. In this manner, the solution comes in contact with fresh and pure solvent only, whereby less solvent is needed and purer product is obtained.

The suspension so obtained was filtered through Buchner funnel under vacuum and the precipitate cake was rinsed with 100 g of cold absolute ethanol. The dry solid was dried under vacuum (0.05 bar) at 58° C. for 5 hours to obtain 366.9 g of odorless white powder. The composition of the powder is given in Table 4. Composition analysis were performed as described in Example 1.

TABLE 4 composition of dry powder of purified soy molasses (total weight: 366.9 g)

| | |
|---|---|
| phospholipids | 1.2% |
| Protein | 2.3% |
| Ash | 0.4% |
| Sugars | 94.8% |
| Water | 1.7% |
| total | 100% |

TABLE 5 sugars composition and yield after purification process

| saccharaide | % weight in final sugar mixture | yield |
|---|---|---|
| Stachyose | 33.8% | 67.2% |
| Raffinose | 5.5% | 61.7% |
| Sucrose | 51.6% | 61.4% |
| Maltose | 1.6% | 65.8% |
| Melibiose | 1.1% | 81.8% |

TABLE 5-continued sugars composition and yield after purification process

| saccharaide | % weight in final sugar mixture | yield |
|---|---|---|
| Mono-S | 4.2% | 76.6% |
| Di-S | 2.2% | 62.8% |
| Total | 100% | Average yield: 64.0% |

It will be realized by persons skilled in the art that numerous variations of the process as described in the above examples can be done without departing from the scope of the present invention. It will be also realized by persons skilled in the art that under industrial scale conditions the yield of the process can be further increased.

What is claimed is:

1. A process for obtaining soy sugars from soy molasses, the process comprising:
   removing phospholipids;
   removing coloring and odorous organic substances;
   removing minerals to obtain purified soy molasses;
   contacting the purified molasses so obtained with alcohol under high shear mixing
   to obtain a suspension soy sugars particles; and
   filtering said suspension,
   thereby a powder containing more than 90 wt. % sugars is obtained.

2. The process of claim 1 further comprising removing proteins.

3. The process of claim 1 wherein said purified soy molasses contains more than about 90 wt. % sugars, on dry matter basis.

4. The process of claim 1 wherein said soy molasses is the concentrated aqueous ethanol extract obtained in the extraction of de-oiled soy flakes, after removal of the alcohol and part of the water.

5. The process of claim 1 wherein the phospholipids removing is performed by contacting the soy molasses with alcohol and hydrocarbon solvent mixture to form a lower aqueous-alcohol layer and an upper hydrocarbon layer, thereby phospholipids are extracted from the aqueous-alcohol layer into the hydrocarbon layer.

6. The process of claim 5 wherein said alcohol is ethanol.

7. The process of claim 5 wherein said hydrocarbon is hexane.

8. The process of claim 5 wherein said alcohol is ethanol, said hydrocarbon is hexane and wherein the weight ratio ethanol; hexane in said solvent mixture is in the range of 3:1 to 1:1 under ordinary gravitational forces.

9. The process of claim 1 wherein the removing of coloring and odorous substances is performed by anion-exchange resin.

10. The process of claim 1 wherein said removing of minerals is performed by cation-exchanger resins anion exchanger resin or a mixture thereof.

11. A process for obtaining powder of soy sugars from soy molasses, the process comprising the following steps:
   a) mixing the molasses with ethanol and hexane;
   b) allowing the mixture of step a to separate into lower alcohol-aqueous phase and an upper hydrocarbon phase;
   c) collecting the lower aqueous phase;

d) removing coloring, off-flavor and odorous organic substances by anion exchange resins;

e) removing minerals;

f) contacting with alcohol under high shear mixing to obtain a suspension of fine purified sugar particles;

g) filtering said suspension thereby a powder containing more than about 90 wt. %, sugars, on dry matter basis, is obtained.

12. The process of claim 11 further comprising removing proteins.

13. A purified soy molasses of more than about 90 wt. % sugars, on dry matter basis.

14. A powder containing more than 90% soy sugars obtained by purifying and solidifying soy molasses.

15. A powder containing more than 90% soy sugars obtained by purifying and solidifying soy molasses by the method of claim 1.

* * * * *